(12) United States Patent
Martinec (10) Patent No.: US 11,363,065 B2
(45) Date of Patent: Jun. 14, 2022

(54) NETWORKED DEVICE IDENTIFICATION AND CLASSIFICATION

(71) Applicant: Avast Software s.r.o., Prague (CZ)

(72) Inventor: Dan Martinec, Čestlice (CZ)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/857,924

(22) Filed: Apr. 24, 2020

(65) Prior Publication Data
US 2021/0336990 A1  Oct. 28, 2021

(51) Int. Cl.
| H04L 29/06 | (2006.01) |
| H04L 9/40 | (2022.01) |
| G06F 16/953 | (2019.01) |
| H04L 67/02 | (2022.01) |
| H04L 67/01 | (2022.01) |

(52) U.S. Cl.
CPC ........ *H04L 63/1483* (2013.01); *G06F 16/953* (2019.01); *H04L 63/083* (2013.01); *H04L 63/0876* (2013.01); *H04L 67/02* (2013.01); *H04L 67/42* (2013.01)

(58) Field of Classification Search
CPC .. G06F 16/285; G06F 16/2255; G06F 16/325; H04L 63/0876; H04L 29/06; H04L 63/083
See application file for complete search history.

(56) References Cited

U.S. PATENT DOCUMENTS

| 8,244,767 | B2 * | 8/2012 | Ancin ................ G06F 16/9014 707/791 |
| 9,165,124 | B1 | 10/2015 | Gurevich et al. |
| 9,734,147 | B2 | 8/2017 | Barouni Ebrahimi et al. |
| 2017/0078286 | A1 | 3/2017 | Hunt et al. |
| 2017/0147575 | A1 * | 5/2017 | Pappu ................ G06F 16/9014 |
| 2017/0286544 | A1 * | 10/2017 | Hunt .................... H04L 63/0876 |
| 2018/0131708 | A1 * | 5/2018 | Pirttilahti ............ G06F 16/9038 |
| 2021/0004583 | A1 * | 1/2021 | Evans ................ G06F 16/9014 |

FOREIGN PATENT DOCUMENTS

CA  2779235  6/2012

OTHER PUBLICATIONS

D. Yu, L. Zhang, Y. Chen, Y. Ma and J. Chen, "Large-Scale IoT Devices Firmware Identification Based on Weak Password," in IEEE Access, vol. 8, pp. 7981-7992, 2020, doi: 10.1109/ACCESS.2020.2964646.*

(Continued)

*Primary Examiner* — Chirag R Patel
(74) *Attorney, Agent, or Firm* — Avek IP, LLC; William B. Kircher (57) ABSTRACT

A method of identifying network devices such as a router includes accessing an HTTP server on at least one network device, and evaluating a web page served by the device's HTTP server. The web page is evaluated to determine whether it is similar to a page group from a plurality of page groups, where each of the plurality of page groups comprises a group of web pages similar to other pages in the page group. If the evaluated web page is determined similar to a page group, the page group most similar to the evaluated web page is identified as corresponding to the identity of the network device.

15 Claims, 6 Drawing Sheets

(56) References Cited

OTHER PUBLICATIONS

ICYCSEE—An Efficient Webpage Classification Algorithm Based on LSH; Jan. 10, 2015; Junjun Liu 1 , Haichun Sun 1 , Zhijun Ding 1; Communications in Computer and Information Science, pp. 250-257.
Tracking Web Spam with HTML Style Similarities; Tanguy Urvoy and Emmanuel Chauveau Pascal Filoche and Thomas Lavergne; France Telecom R&D; ACM Journal Name, vol. V, No. N, Month 20YY, pp. 1-26.

* cited by examiner

```
<!DOCTYPE html PUBLIC "-//W3C//DTD XHTML 1.0 Transitional//EN"
        "http://www.w3.org/TR/xhtml1/DTD/xhtml1-transitional.dtd">
<html>
<head>
<meta http-equiv="Content-Type" content="text/html;charset=utf-8" />
<meta http-equiv="pragma" content="no-cache" />
<!-- release 102414-->
<!-- (c) Copyright 2011-2014, ARRIS Group, Inc., All rights reserved. -->
<!--  <link rel="stylesheet" type="text/css" href="base.css"> -->
<link rel="stylesheet" type="text/css" media="all" href="css/global.css"/>
<!--[if IE 6]>
<link rel="stylesheet" type="text/css" href="css/ie6styles.css"/>
<![endif]-->
<!--[if IE 7]>
<link rel="stylesheet" type="text/css" href="css/ie7styles.css"/>
<![endif]-->
<link type="text/css" href="css/ui-lightness/jquery-ui-1.8.21.custom.css"
rel="stylesheet"/>
<!-- ARRIS MOD START FOR CLM34044 -->
<script type="text/javascript" src="scripts/jquery-
1.9.0.min.js?ver=9.1.103DE2"></script>
<script type="text/javascript" src="scripts/jquery-migrate-
1.0.0.js?ver=9.1.103DE2"></script>
<script type="text/javascript" src="scripts/jquery-ui-
1.9.2.custom.min.js?ver=9.1.103DE2"></script>
<!-- ARRIS MOD END -->
<script type="text/javascript" src="scripts/json2.js?ver=9.1.103DE2"></script>
```

FIG. 3

```
'!DOCTYPE',
'html',
'PUBLIC',
'"-//W3C//DTD',
'XHTML',
'1.0',
'Transitional//EN"\n',
'"http://www.w3.org/TR/xhtml1/DTD/xhtml1-transitional.dtd">\n',
'html>\n',
'head>\n',
'meta',
'http-equiv',
'"Content-Type"',
'content',
'"text/html;charset'
...
'src',
'"scripts/json2.js?ver',
'9.1.103DE2">',
'/script>'
```

```
LSH_group_1:[-1840653069, -1330466053, -9361907201, -1523834629,-1721582984]
LSH_group_2:[-2006874621, -2025651241, -2015527170, -2033997958,-2026670085]
LSH_group_3:[-2034803712, -2010594697, -2001323392, -2036279553,-2037389829]
```

FIG. 6

A.     $-\varepsilon < a_n - a_{n+1} < \varepsilon$
B.     $-\varepsilon < b_n - b_{n+1} < \varepsilon$
C.     $-\varepsilon < c_n - c_{n+1} < \varepsilon$
D.     $-\varepsilon < d_n - e_{n+1} < \varepsilon$
E.     $-\varepsilon < e_n - e_{n+1} < \varepsilon$

FIG. 7

```
LSH_group_1:[-1840653069, -1330466053, -9361907201, -1523834629,-1721582984]
LSH_group_2:[-1840653089, -1330466142, -9361907207, -1523834674,-1721583011]
```

NETWORKED DEVICE IDENTIFICATION AND CLASSIFICATION

FIELD

The invention relates generally to computer networks, and more specifically to networked device identification and classification.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, private network security appliances can monitor network activity on a private network, protecting a wide variety of devices on the network including devices such as Internet of Things devices that aren't capable of having third-party security software installed or that lack the resources to perform effective security functions.

For example, Avast's Omni security appliance uses a technique known as ARP spoofing to insert itself between private network devices and the private network's router, enabling it to monitor and selectively filter traffic between private network devices and a public network connected to the router. But, because routers and private network devices aren't designed to have traffic between them intercepted by a third party device, successful setup and configuration can sometimes be dependent on the type of router and other devices on the private network.

It is therefore desirable to identify or classify devices on a private network, such as to determine their suitability for use with services such as a private network security appliance.

SUMMARY

One example embodiment of the invention comprises a method of identifying network devices such as a router, including accessing an HTTP server on the network device and evaluating a web page served by the device's HTTP server. The web page is evaluated to determine whether it is similar to a page group from a plurality of page groups, where each of the plurality of page groups comprises a group of web pages similar to other pages in the page group. If the evaluated web page is determined similar to a page group, the page group most similar to the evaluated web page is identified as corresponding to the identity of the network device.

In a further example, the web page is evaluated by dividing it into one or more tokens using one or more separation characters such as "=", "<", ">", and " " (white space). The one or more tokens are hashed to generate a frequency vector, and a local sensitivity hash is generated from one or more of the frequency vectors. One or more local sensitivity hashes derived from the evaluated page is compared to one or more local sensitivity hashes derived from pages in each of the plurality of page groups to determine whether the evaluated page shares a device identity with the device or devices represented by one of the plurality of page groups.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to a corporate computer to steal, delete, or change information, or to encrypt the information and hold it for ransom via "ransomware." Smartphone apps, Microsoft Word documents containing macros, Java applets, and other such common documents are all frequently infected with malware of various types, and users rely on tools such as antivirus software or other malware protection tools to protect their computerized devices from harm. Malicious users often attempt to steal user credentials to popular online websites or services by creating fake sites pretending to be the popular websites, directing users to the fake sites by prompting them with emails alerting them to fictitious problems with their account that can be fixed by logging on or providing other such valuable information.

In a typical home computer or corporate environment, firewalls inspect and restrict the types of communication that can occur over a network, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes. Web browser features or extensions similarly block unwanted content such as scripts, advertisements, popups, tracking cookies, known malicious downloads or websites, and other such undesirable web content. Network security appliances insert themselves between a router or gateway and private network devices such as computers, smartphones, and appliances on the private network, monitoring and selectively filtering network traffic between the private network devices and the router or gateway.

In a more detailed example, a network security device uses ARP spoofing to appear to client devices on the private network to be the router, and to appear to the router to be the private network devices. Network traffic between the router and the private network devices is therefore routed through the security device, which can inspect the traffic for known or potentially malicious content and selectively block or filter such content from being forwarded to the private network devices. But, because some routers and other network devices work better with such techniques than others, identifying the router and other devices on the private network may help determine whether the devices will support the network security device, or require a certain configuration to work best.

Some examples described herein therefore seek to identify network devices such as a router by accessing an HTTP server on at least one network device, and evaluating a web page served by the HTTP server of the at least one network device. The web page is evaluated to determine whether it is similar to a page group from a plurality of page groups, where each of the plurality of page groups comprises a group of web pages similar to other pages in the page group. If the evaluated web page is determined similar to a page group, the page group most similar to the evaluated web page is identified as corresponding to the identity of the network device.

In a more detailed example, the web page is evaluated by dividing it into one or more tokens using one or more separation characters such as "=", "<", ">", and " " (white space). The one or more tokens are hashed to generate a frequency vector, and a local sensitivity hash is generated from one or more of the frequency vectors. One or more local sensitivity hashes derived from the evaluated page is compared to one or more local sensitivity hashes derived from pages in each of the plurality of page groups to determine whether the evaluated page shares a device identity with the device or devices represented by one of the plurality of page groups.

Figure 1:
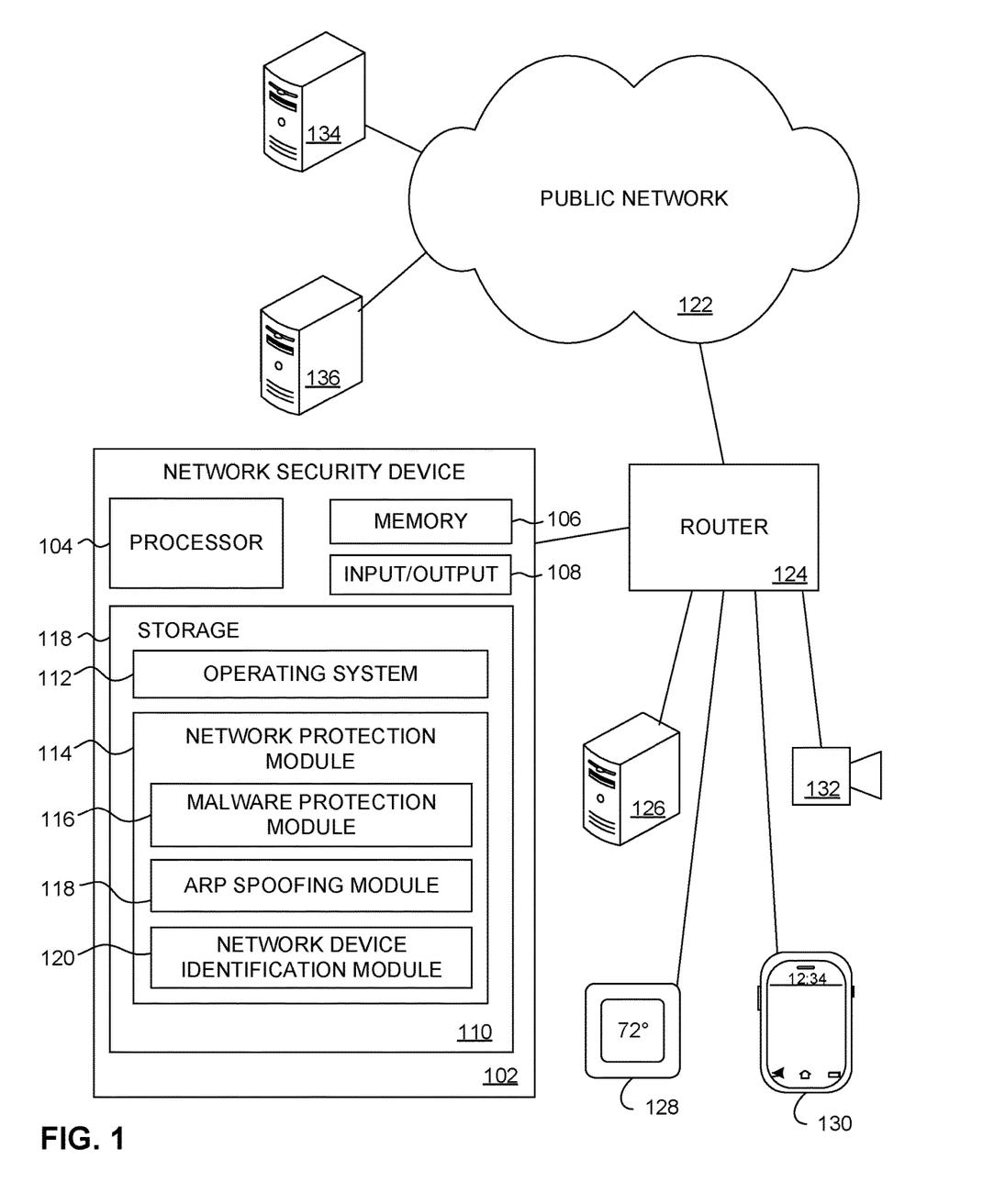
FIG. 1 shows a computerized network security device including a network device identification module, consistent with an example embodiment.

FIG. 1 shows a computerized network security device including a network device identification module, consistent with an example embodiment. Here, a network security device 102 comprises a processor 104, memory 106, input/output elements 108, and storage 110. Storage 110 includes an operating system 112, and network protection module 114 that is operable to provide various functions to protect devices on a private network from potentially harmful network content. The network protection module 114 further comprises a malware protection module 116 operable to search for and detect known or potentially malicious content in network communication, and ARP spoofing module operable to insert the network security device between a router and private network devices in a private network. This is achieved by notifying the router that it is to receive network traffic destined for the private network devices, and notifying network devices that it is to receive traffic destined for the router. This enables the network security device to inspect the network traffic between the router (and a public network such as the Internet) and private network devices and to selectively block content known or suspected to be malicious.

The network protection module 114 also includes a network device identification module 120, which can be used to identify the router and various other devices on the private network, such as to determine whether the router is compatible with the network security device or requires special configuration to be used in an ARP spoofing environment.

The network security device 102 is coupled to a public network 122 via a router 124, which also couples the network security device to private network devices including personal computer 126, smart thermostat 128, smart phone 130, and video camera 132. These devices may communicate with remote servers 134 via the public network 122, including potentially downloading malicious content from the servers. The public network devices may also be attacked by remote computers 136, such as by malicious users looking for known flaws in routers 124 or other such vulnerabilities to access the private network devices. In various examples, malicious users can attempt to steal information such as logins or financial account information, steal computing resources such as to use personal computer 126 to mine cryptocurrency or send spam emails as part of a botnet, or access private data such as snooping on the private network's environment by unauthorized access of video camera 132.

In operation, the network security device 102 is connected to a private network by establishing a network connection between the network security device and the private network's router 124. The network security device uses its network identification module to determine what devices are on the private network, and particularly what router 124 is managing the private network. If the router is not compatible with the network security device's ARP spoofing module 118 or other functions, it notifies a user or administrator of the incompatibility. In another example, it determines whether the router 124 requires special configuration to work with the network security device, and in a further example performs such configurations to the router to provide an easy installation and configuration experience for the user. Once the network security device has been determined compatible with the router 124 and other devices on the private network and configured using its ARP spoofing module to intercept traffic between the router and private network devices, the network security device uses malware protection module 116 to selectively block known or potentially malicious content from public network 122 from reaching the private network devices.

In another example, the network device identification module 120 is employed on a device other than the network security device, such as on an application executable on computer 126 or smartphone 130, and is operable to determine the suitability of the private network for buying and installing network security device 102. In a more detailed example, a user downloads software including network device identification module 120 to a computer such as personal computer 126, and installs and executes the software. The software interacts with devices on the private network, including router 124, to determine the identity or classification of the devices. The software then determines whether identified or classified devices such as the router 124 are compatible with network security device 102, and notifies the user whether network security device 102 will work with the user's private network devices.

The network identification module in a more detailed example identifies or classifies network devices by accessing an HTTP server on the network device and evaluating a web page served by the device's HTTP server. The web page is evaluated to determine whether it is similar to a page group from a plurality of page groups, where each of the plurality of page groups comprises a group of web pages similar to other pages in the page group. The web page is evaluated by dividing it into one or more tokens using one or more separation characters such as "=", "<", ">", and " " (white space). The one or more tokens are hashed to generate a frequency vector, and a local sensitivity hash is generated from one or more of the frequency vectors. One or more local sensitivity hashes derived from the evaluated page is compared to one or more local sensitivity hashes derived from pages in each of the plurality of page groups to determine whether the evaluated page shares a device identity with the device or devices represented by one of the plurality of page groups. If the evaluated web page is determined similar to a page group, the page group most similar to the evaluated web page is identified as corresponding to the identity of the network device, and is considered the device's classification or identity.

Figure 2:
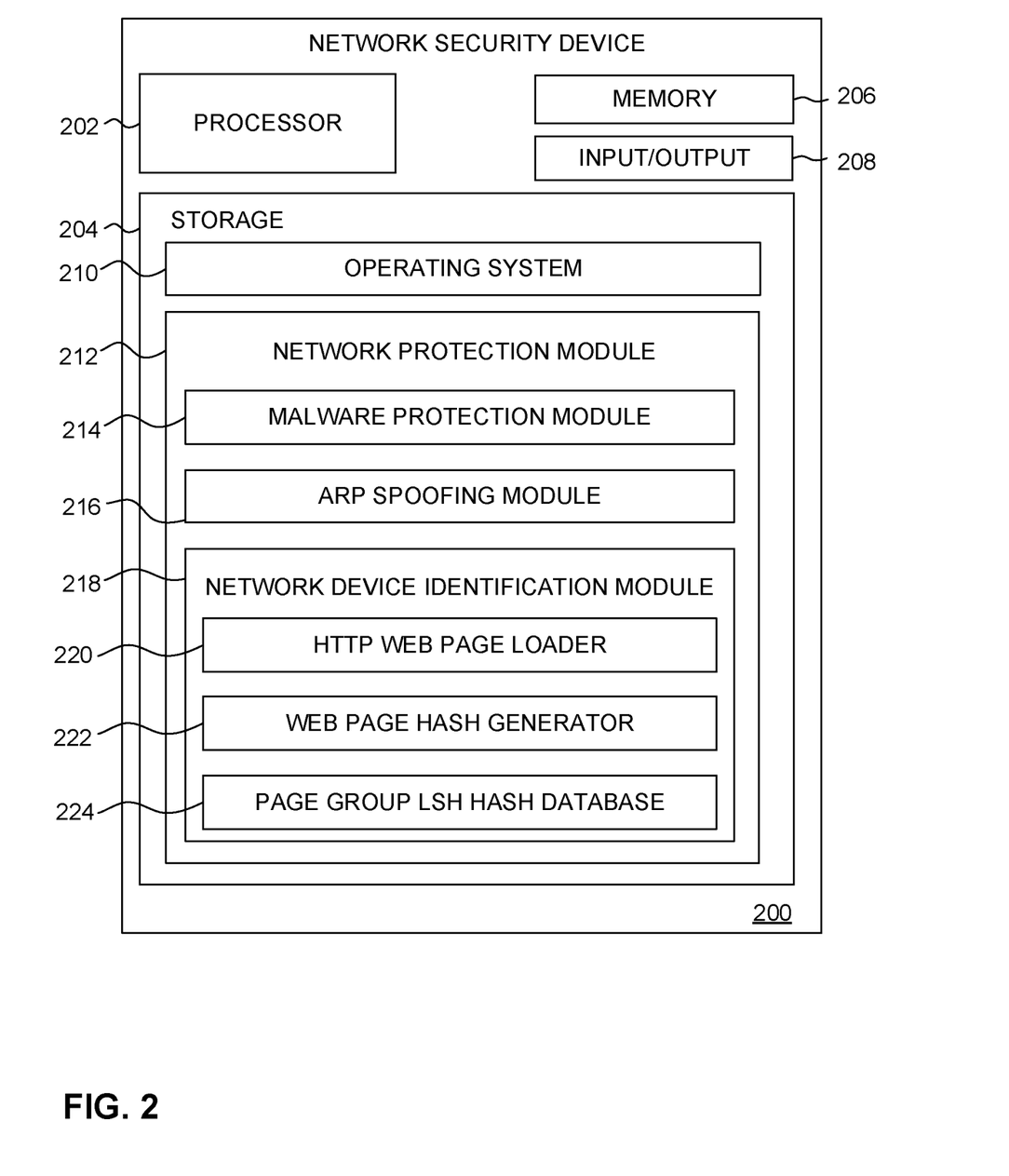
FIG. 2 shows a more detailed example of a network device employing a network device identification module, consistent with an example embodiment.

FIG. 2 shows a more detailed example of a network device employing a network device identification module, consistent with an example embodiment. Here, processor 202 is operable to execute program instructions loaded from storage 204 into memory 206. The program instructions use input/output 208, such as a network interface, to perform various functions such as communicating with other computerized devices coupled to the same network. Storage 204 also includes operating system 210, which controls the computerized device's basic functions and facilitates executable software programs' interaction with the computerized device's hardware and services.

The network security device 200 here includes a network protection module 212, which in various embodiments is an executable application, a service executing within the operating system, or some other combination of hardware and/or software. The network protection module 212 includes malware protection module 214, which is operable to screen data for known or suspected malicious content, and in a further example to block execution, network transmission, or other activity related to the known or suspected malicious content. ARP spoofing module 216 enables the network security device 200 to insert itself into a private network between a router or gateway and other private network devices by broadcasting ARP packets that falsely associate the network security device's MAC address with the IP addresses of other network devices, such that network traffic from router 124 to private network devices such as smartphone 130 is instead routed to the network security device 102, which screens the network traffic for known or suspected malicious content and selectively forwards the network traffic to smartphone 130. Similarly, traffic from private network devices such as smartphone 130 destined for the router is instead sent to the network security device 102, which inspects the traffic for content such as a web page request for a known or suspicious website, and selectively blocks or forwards such traffic to router 124.

Network device identification module 218 in this example serves to determine whether router 124 and other private network devices are compatible with the ARP spoofing or other methods employed by the network security device 200, and in a further example determines whether special configuration is required for devices such as router 124 to work with the network security device on a private network. The network device identification module 218 includes an HTTP web page loader 220, which queries the private network devices for web server content, such as configuration web pages or other such HTTP server pages. If a web page is found on a private network device by HTTP web page loader 220, the loaded web page is processed by web page hash generator 222 into a hash which characterizes the content of the web page in a way that enables the hash of one web page to be compared with the hash of another web page to determine the degree of similarity between the web pages. A page group LSH hash database 224 stores hashes and other data for a variety of different known network devices, enabling the network device identification module to compare the hash generated using web page hash generator 222 for a target network device with hashes from other devices to determine the identity of the target network device.

Figure 3:
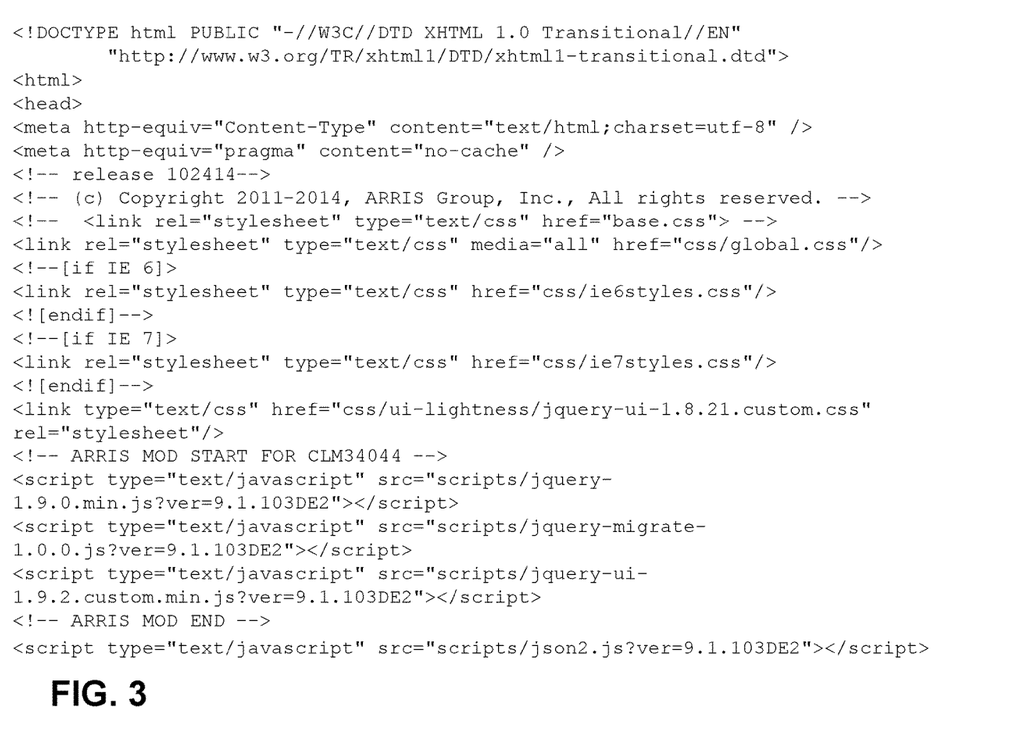
FIG. 3 shows web page HTML text, consistent with an example embodiment.

FIG. 3 shows web page HTML text, consistent with an example embodiment. Here, the network security device's http web page loader 220 has requested a web page from a private network device, such as a router, and has received an HTML text web page as a result, the beginning of which is shown in FIG. 3. The web page will be further processed to identify the private network device, so in a further example rules are applied to ensure that the web page received and processed is a particular web page, such as the device's home page or login page. Other pages such as redirect pages may be disregarded, as they contain little data useful for device identification. The web page in some examples is filtered or otherwise preprocessed before tokenization, such as to search for known text strings such as known manufacturer names, model names, firmware revisions, and the like.

Figure 4:
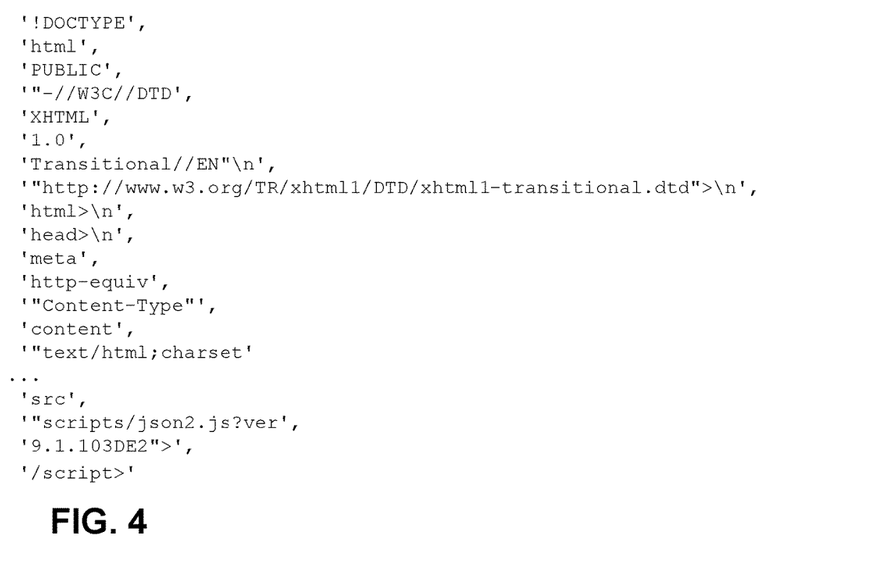
FIG. 4 shows tokenization of the web page HTML text, consistent with an example embodiment.

FIG. 4 shows tokenization of the web page HTML text, consistent with an example embodiment. Here, the HTML page is split into text tokens, based on token delimiters such as "=", "<", ">", and " " (white space). This creates groups with similar semantic meaning across different web pages, such as different login screens or home pages of different devices from different manufacturers. For example, important page parameters often follow an equal sign, and this type of separation in tokenization splits these parameters into separate groups. In this example, the ordering of tokens does not matter, but in other examples the order will be preserved and considered in determining page similarity.

Figure 5:
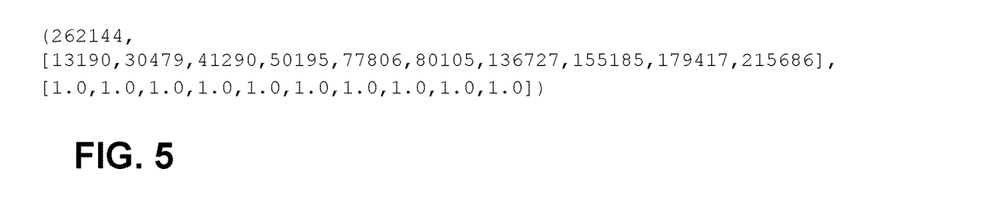
FIG. 5 shows the output of such a hash function for the tokens of FIG. 4, including both hash values and frequency for each of several distinct tokens, consistent with an example embodiment.

The tokens shown in FIG. 4 are next hashed using a hash function that takes the tokens as input strings and outputs frequency vector. To do this, the hash function calculates a fixed length hash of each string in the set of tokens, and then determines the frequency of these hashes. FIG. 5 shows the output of such a hash function for the tokens of FIG. 4, including both hash values and frequency for each of several distinct tokens.

Figure 6:
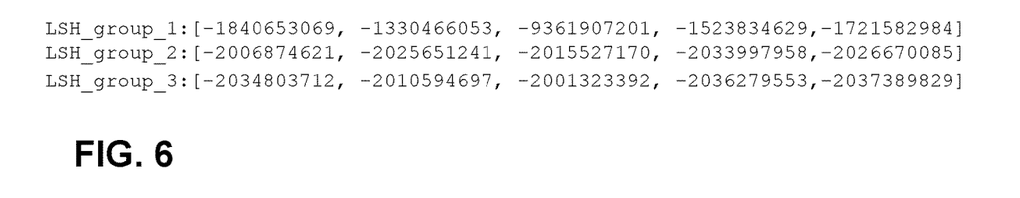
FIG. 6 shows local sensitivity hashing of the token strings, consistent with an example embodiment.

FIG. 6 shows local sensitivity hashing of the token strings, consistent with an example embodiment. Here, each of the frequency vectors generate during hashing as shown in FIG. 5 are processed by a special type of function called local sensitivity hashing (or LSH), which produces a hash function that varies in proportion to differences in the input vectors, which is substantially different from the operation of most hash functions. In a more detailed example, a particular type of local sensitivity hash function called a minhash LSH algorithm is employed, with a setting numHashTables=5. This results in an output having five distinct values in an output group or vector, which increases the precision and discrimination of the hash function relative to outputting fewer values. The output is characterized as a LSH group, as shown in FIG. 6.

Figure 7:
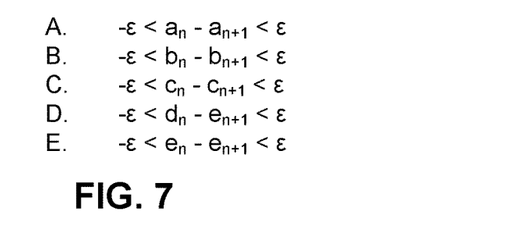
FIG. 7 shows an example of setting thresholds E for each of five values in an LSH group, consistent with an example embodiment.
Figure 8:
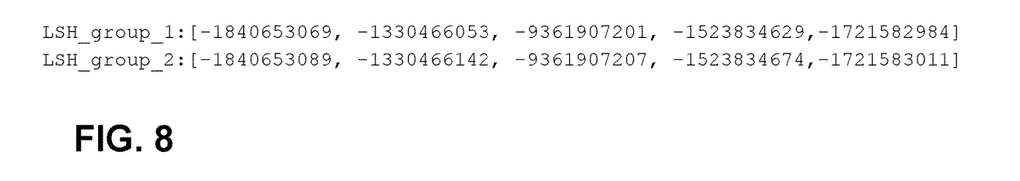
FIG. 8 shows two LSH groups that are aggregated due to their values being within a threshold value of one another, consistent with an example embodiment.

Aggregating similar pages together, or grouping similar pages into groups of similar or related hardware devices, is achieved in some examples by setting thresholds by which each of the five output values in the LSH group can vary from another LSH group to be aggregated together. In one such example a threshold is set at $\varepsilon=100$, such that if the five values in an LSH group are each within 100 of another LSH group, the two LSH groups are aggregated and considered to be from the same or similar device. FIG. 7 shows an example of setting thresholds E for each of five values in an LSH group, consistent with an example embodiment. Note that for each of the five values A-E of each of the LSH groups of FIG. 6, the difference between a first LSH group and a second LSH group can have a value no more than 100 greater or less than each other to be aggregated. LSH groups that are aggregated into the same web page group are likely from substantially similar versions of the same web page, and so are considered to be likely from the same device. FIG. 8 shows two LSH groups that are aggregated due to their values being within a threshold value of one another, consistent with one such example.

Classification is improved in some examples by focusing on information that improves classification, such as deriving tokens from known strings such as device names, model names, firmware versions, device manufacturers, and the like. In other examples, characteristics other than or in addition to HTTP server web pages are used, such as UPNP, DNS, MDNS, or other replies to device queries. Similarly, the response to standardized queries, such as a directory served as a result of a DLNA request or other response to a standard query may be used to identify or characterize a device. The presence or absence of certain services, open ports, or other such characteristics can also help identify a device in some examples.

Figure 9:
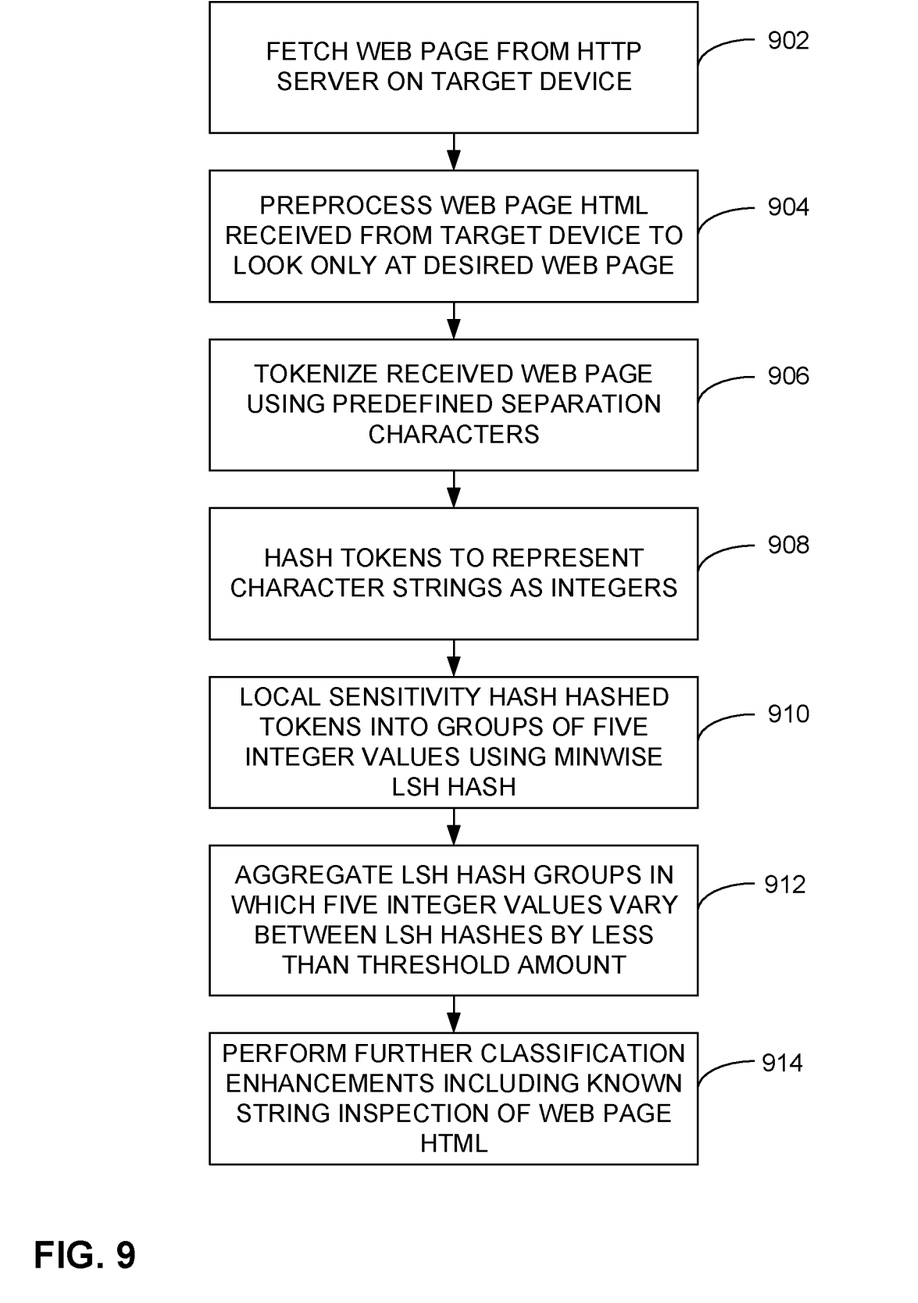
FIG. 9 is a flowchart of a method of identifying a network device, consistent with an example embodiment.

FIG. 9 is a flowchart of a method of identifying a network device, consistent with an example embodiment. At 902, the network device identification module of a network security appliance or other computerized device begins the process of identifying or classifying a target device on the same private network by discovering the presence of the device and requesting a web page from an HTTP server on the target device. The HTTP server on the target device responds with a web page in HTML format, which is a text markup language that is used to render the web page. The network device identification module receives and preprocesses the web page HTML at 904, which in a more detailed example is a specific page from a number of different pages the target device can provide, such as a login page or the home or root page. Preprocessing the web page in a more detailed example includes filtering out input data that is not part of the desired web page content, such as redirects or other web pages, bugs or flaws in web page content that are common in less expensive routers, and other such content that is not useful in determining the identity of the web page's target device.

The web page is then tokenized at 906, which involves converting the web page text into a number of different tokens or segments of text that are of particular interest. This is achieved in some examples by using certain delimiter characters to denote the beginning and end of tokens, such as an equal sign "=", a white space " ", a left arrow "<", and a right arrow ">". The choice of separating characters varies in other examples based on the content of the page, such as where different markup schemes are used to convey content that is distinctive or characterizes the identity of the page. This is done so that token groups with similar semantic meaning can be generated across a number of different devices and web pages, as important parameters of the web page are typically set apart or indicated by the chosen delimiter characters.

The tokens generated at 906 are then converted to numeric integers at 908 by using a hash function, which in this example is a HashTF function. The input is the tokens generated at 906 (such as are shown in FIG. 4), and the output is a series of integers and corresponding frequency information referred to as a frequency vector (such as are shown in FIG. 5). The integer representations and frequency information generated by the hash function at 908 are then provided as input to a local sensitivity hash function at 910, which converts the input strings into an output set of integers using a hash formula that causes the output strings to vary in proportion or in correspondence with the differences in the input strings. The hash function used at 910 is in a more detailed example a minwise local sensitivity hash, or minwise LSH hash function, having an numHashTables value of five such that it produces an output of five integers for each LSH hash group as is shown in FIG. 6.

The LSH hash outputs representing different pages are aggregated at 912, by associating LSH hash functions where each of the five integers in the output vary by a threshold amount or less from the corresponding integers of another LSH hash function output representing a different page of a different device. Devices that have very similar web pages, such as slightly different versions of firmware and consequently slightly different web pages, can therefore be aggregated together and recognized as a single device or family of devices. A more detailed example of aggregation is shown using the thresholds of FIG. 7, and the aggregated LSH hashes of FIG. 8 (which vary by less than a threshold of ±100 for each of the five integers in their respective LSH hash outputs).

Further classification or refinement is performed in some examples as shown at 914, which includes actions such as inspecting the web pages for distinctive information that can improve classification or identification, such as manufacturer name, model name, device manufacturer, firmware version, and other such distinctive information. This information in various embodiments is identified by a user (such as by providing a list of known manufacturers to a software module that searches for such information), is identified by machine learning, or is implemented in other ways. For example, a web page H1 header may often identify the manufacturer and/or model of a router, and so may be selected either manually or by machine learning for use in improving the classification of devices.

The examples presented here show how network devices can be identified and/or classified using HTML web pages served by an HTTP server of the network devices, using various processing functions to characterize and compare the network device's web page with web pages from other known devices. Because the input is a simple HTML web page that is in a more detailed example tokenized using simple rules before hashing, the processing work required to evaluate and characterize a web page is relatively modest. Further, the methods described herein can classify or group similar web pages together using different thresholds for variance between devices, enabling grouping of the same device running slightly different firmware, grouping similar devices from the same manufacturer, or grouping devices in other ways that provide a benefit to a user, such as being able to determine whether a target device is a device or part of a family of devices that support certain functions such as ARP spoofing compatibility for a network security device.

Although network device evaluation modules shown in the examples here are implemented on a computer or a network security device, a variety of other computerized systems may be used in other examples for the network device identification module, as well as various clients, servers, and other devices involved in performing the methods described in the examples above.

Figure 10:
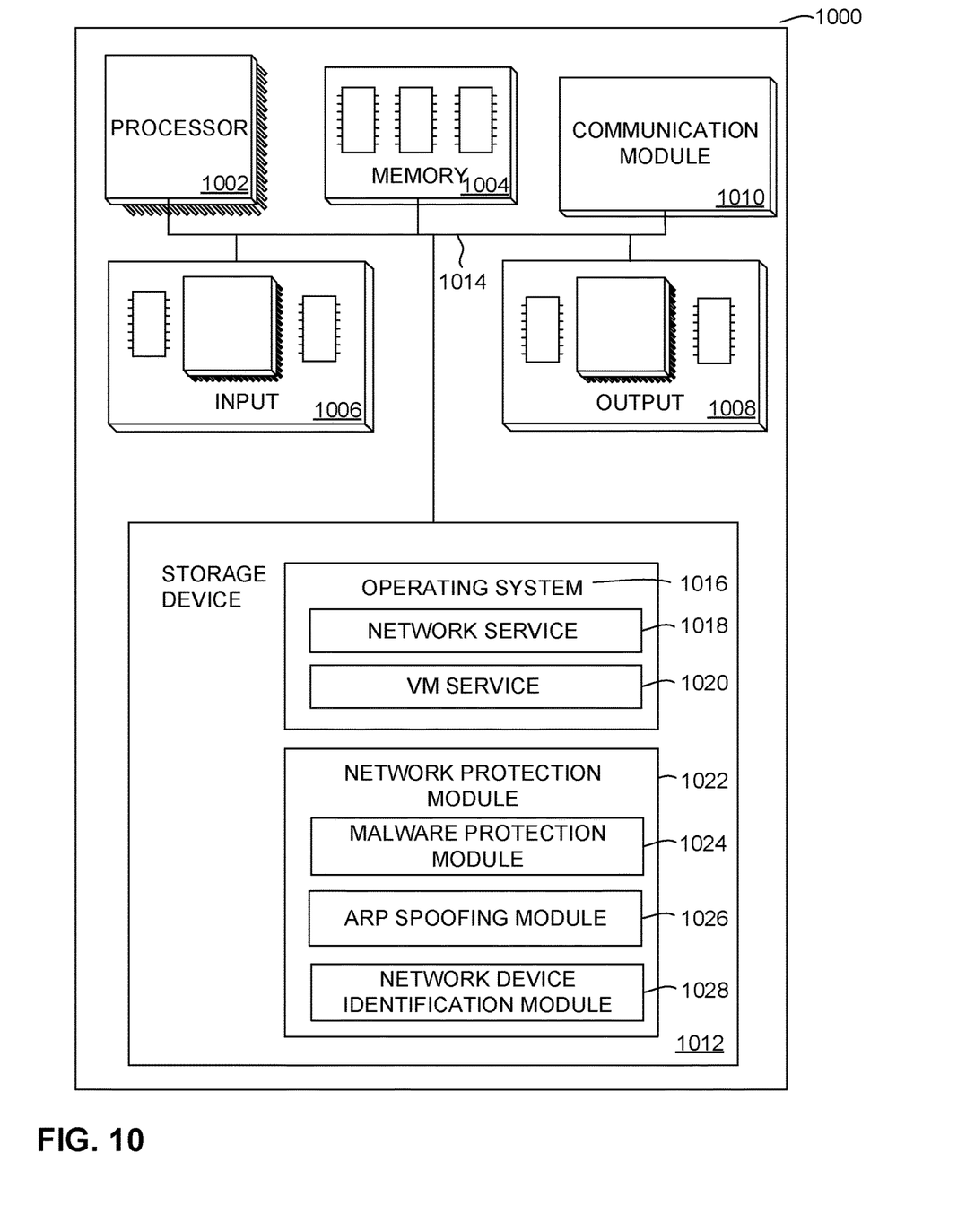
FIG. 10 is a computerized system comprising a network device identification module, consistent with an example embodiment.

FIG. 10 is a computerized system comprising a network device identification module, consistent with an example embodiment. FIG. 10 illustrates only one particular example of computing device 1000, and other computing devices 1000 may be used in other embodiments. Although computing device 1000 is shown as a standalone computing device, computing device 1000 may be any component or system that includes one or more processors or another suitable computing environment for executing software instructions in other examples, and need not include all of the elements shown here.

As shown in the specific example of FIG. 10, computing device 1000 includes one or more processors 1002, memory 1004, one or more input devices 1006, one or more output devices 1008, one or more communication modules 1010, and one or more storage devices 1012. Computing device 1000, in one example, further includes an operating system 1016 executable by computing device 1000. The operating system includes in various examples services such as a network service 1018 and a virtual machine service 1020 such as a virtual server. One or more applications, such as similar network protection module 1022 are also stored on storage device 1012, and are executable by computing device 1000.

Each of components 1002, 1004, 1006, 1008, 1010, and 1012 may be interconnected (physically, communicatively, and/or operatively) for inter-component communications, such as via one or more communications channels 1014. In some examples, communication channels 1014 include a system bus, network connection, inter-processor communication network, or any other channel for communicating data. Applications such as malware evaluation module 1022 and operating system 1016 may also communicate information with one another as well as with other components in computing device 1000.

Processors 1002, in one example, are configured to implement functionality and/or process instructions for execution within computing device 1000. For example, processors 1002 may be capable of processing instructions stored in storage device 1012 or memory 1004. Examples of processors 1002 include any one or more of a microprocessor, a controller, a digital signal processor (DSP), an application specific integrated circuit (ASIC), a field-programmable gate array (FPGA), or similar discrete or integrated logic circuitry.

One or more storage devices 1012 may be configured to store information within computing device 1000 during operation. Storage device 1012, in some examples, is known as a computer-readable storage medium. In some examples, storage device 1012 comprises temporary memory, meaning that a primary purpose of storage device 1012 is not long-term storage. Storage device 1012 in some examples is a volatile memory, meaning that storage device 1012 does not maintain stored contents when computing device 1000 is turned off. In other examples, data is loaded from storage device 1012 into memory 1004 during operation. Examples of volatile memories include random access memories (RAM), dynamic random access memories (DRAM), static random access memories (SRAM), and other forms of volatile memories known in the art. In some examples, storage device 1012 is used to store program instructions for execution by processors 1002. Storage device 1012 and memory 1004, in various examples, are used by software or applications running on computing device 1000 such as network protection module 1022 to temporarily store information during program execution.

Storage device 1012, in some examples, includes one or more computer-readable storage media that may be configured to store larger amounts of information than volatile memory. Storage device 1012 may further be configured for long-term storage of information. In some examples, storage devices 1012 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication modules 1010. Computing device 1000 in one example uses communication module 1010 to communicate with external devices via one or more networks, such as one or more wireless networks. Communication module 1010 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 1000 uses communication module 1010 to wirelessly communicate with an external device such as via public network 122 of FIG. 1.

Computing device 1000 also includes in one example one or more input devices 1006. Input device 1006, in some examples, is configured to receive input from a user through tactile, audio, or video input. Examples of input device 1006 include a touchscreen display, a mouse, a keyboard, a voice responsive system, video camera, microphone or any other type of device for detecting input from a user.

One or more output devices 1008 may also be included in computing device 1000. Output device 1008, in some examples, is configured to provide output to a user using tactile, audio, or video stimuli. Output device 1008, in one example, includes a display, a sound card, a video graphics adapter card, or any other type of device for converting a signal into an appropriate form understandable to humans or machines. Additional examples of output device 1008 include a speaker, a light-emitting diode (LED) display, a liquid crystal display (LCD), or any other type of device that can generate output to a user.

Computing device 1000 may include operating system 1016. Operating system 1016, in some examples, controls the operation of components of computing device 600, and provides an interface from various applications such as network protection module 1022 to components of computing device 1000. For example, operating system 1016, in one example, facilitates the communication of various applications such as network protection module 1022 with processors 1002, communication unit 1010, storage device 1012, input device 1006, and output device 1008. Applications such as network protection module 1022 may include program instructions and/or data that are executable by computing device 1000. As one example, network protection module 1022 executes a program instruction sequence 1024 that selectively forwards network data from a public network to private network devices, after inserting the computerized system between the a router and the private network devices using ARP spoofing module 1026. A network device identification module 1028 queries private network devices such as the router for information such as web pages hosted by the device's HTTP server to identify the device, such as by using minwise local sensitivity hashing of tokens or other select data from the web page and/or other content. These and other program instructions or modules may include instructions that cause computing device 1000 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of identifying network devices, comprising:
   accessing an HTTP server on at least one network device;
   evaluating a web page served by the HTTP server of the at least one network device, wherein evaluating the web page comprises dividing the web page into one or more tokens using one or more separation characters and hashing the one or more tokens to generate a frequency vector;
   determining whether the evaluated web page is similar to a page group from a plurality of page groups, each of the plurality of page groups comprising a group of web pages similar to other pages in the page group; and
   if the evaluated web page is determined similar to a page group, providing an output based on the page group most similar to the evaluated web page.

2. The method of identifying network devices of claim 1, wherein the output based on the page group most similar to the evaluated web page comprises an identity of the at least one network device.

3. The method of identifying network devices of claim 1, wherein evaluating a web page served by the HTTP server of the at least one network device comprises evaluating a user login page served by the HTTP server.

4. The method of identifying network devices of claim 1, wherein evaluating a web page served by the HTTP server of the at least one network device comprises evaluating a home page served by the HTTP server.

5. The method of identifying network devices of claim 1, wherein the one or more separation characters comprise one or more of "=", "<", ">", and " ".

6. The method of identifying network devices of claim 1, further comprising generating a local sensitivity hash from one or more frequency vectors.

7. The method of identifying network devices of claim 6, wherein determining whether the evaluated web page is similar to a page group from a plurality of page groups comprises comparing one or more local sensitivity hashes derived from the evaluated page to one or more local sensitivity hashes derived from pages in each of the plurality of page groups.

8. The method of identifying network devices of claim 1, wherein dividing the web page into one or more tokens comprises searching the web page for one or more known strings.

9. The method of identifying network devices of claim 8, wherein the one or more known strings comprise at least one of device manufacturer, device name, model name, and firmware version.

10. A method of generating page groups of similar network devices, comprising:
    accessing an HTTP server on a network device;
    evaluating a web page served by the HTTP server of the network device, wherein evaluating the web page comprises dividing the web page into one or more tokens using one or more separation characters and hashing the one or more tokens to generate a frequency vector;
    determining whether the evaluated web page is similar to a page group from one or more page groups if such one or more page groups exist, each of the plurality of page groups comprising a group of web pages similar to other pages in the page group; and
    if the evaluated web page is determined similar to an existing page group, adding the network device to the page group; and
    if the evaluated web page is determined not similar to an existing page group, adding the network device to a new page group.

11. The method of generating page groups of similar network devices of claim 10, wherein evaluating a web page served by the HTTP server of the network device comprises evaluating a user login page or a home page served by the HTTP server.

12. The method of generating page groups of similar network devices of claim 10, further comprising generating a local sensitivity hash from one or more frequency vectors.

13. The method of generating page groups of similar network devices of claim 12, wherein determining whether the evaluated web page is similar to an existing page group from a plurality of page groups comprises comparing one or more local sensitivity hashes derived from the evaluated page to one or more local sensitivity hashes derived from pages in each of the plurality of existing page groups.

14. The method of generating page groups of similar network devices of claim 10, wherein dividing the web page into one or more tokens comprises searching the web page for one or more known strings.

15. The method of generating page groups of similar network devices of claim 14, wherein the one or more known strings comprise at least one of device manufacturer, device name, model name, and firmware version.

* * * * *